United States Patent [19]
Morioka et al.

[11] Patent Number: 5,334,895
[45] Date of Patent: Aug. 2, 1994

[54] SPINDLE MOTOR WITH THE STATOR CORE SUPPORTED BY A RESIN MEMBER

[75] Inventors: Yuji Morioka; Masanobu Chuta; Kuniyasu Iwazaki; Kihachiro Ohta, all of Kyoto, Japan

[73] Assignee: Nippon Densan Corporation, Kyoto, Japan

[21] Appl. No.: 853,121

[22] Filed: Mar. 18, 1992

[30] Foreign Application Priority Data

Mar. 20, 1991 [JP] Japan ................. 3-081713
Mar. 20, 1991 [JP] Japan ................. 3-081769
Mar. 27, 1991 [JP] Japan ................. 3-089964

[51] Int. Cl.⁵ ............ H02K 7/14; H02K 5/00
[52] U.S. Cl. .................... 310/67 R; 310/91
[58] Field of Search ............ 310/67 R, 90, 91, 156, 310/216, 217, 43, 51; 360/97.02, 98.07, 99.04, 99.08

[56] References Cited

U.S. PATENT DOCUMENTS

| | | |
|---|---|---|
| 4,647,803 | 3/1987 | von der Heide et al. ........ 319/67 R |
| 4,682,065 | 7/1987 | English et al. ........ 310/90 |
| 4,760,299 | 7/1988 | Dickie et al. ........ 310/91 |
| 5,045,738 | 9/1991 | Hishida et al. ........ 310/90 |
| 5,177,650 | 1/1993 | Jabbari et al. ........ 360/99.04 |

Primary Examiner—Steven L. Stephan
Assistant Examiner—C. LaBalle

[57] ABSTRACT

A spindle motor having a housing, a hub member rotatable relative to the housing, a bearing disposed between the housing and the hub member, a rotor magnet mounted on the hub member, and a stator disposed in a facing relationship with the rotor magnet. The hub member includes a supporting wall portion, which cooperates with the stator to constitute an air seal structure. A magnetic fluid seal is provided at a position outward of the bearing, and includes a conductive plate for grounding static electricity. The bearing is comprised of a radial ball bearing, which includes certain improvement.

5 Claims, 8 Drawing Sheets

SPINDLE MOTOR WITH THE STATOR CORE SUPPORTED BY A RESIN MEMBER

BACKGROUND OF THE INVENTION

1. Field of the Invention

The present invention relates to a motor whose rotor is rotated for driving.

2. Description of the Related Art

A spindle motor, an example of a motor, generally has a housing and a hub member rotatable relative to the housing, which are disposed with a bearing means provided therebetween. A rotor magnet is mounted on the hub member, while a stator is mounted on the housing in such a manner as to face the rotor magnet. A labyrinth seal structure is also provided between the housing and the hub member. The labyrinth seal structure prevents grease or the like from the bearing means from seeping into an accommodation chamber accommodating a recording member such as a magnetic disk.

However, a spindle motor of this type, in which a labyrinth seal structure is especially provided for the above-stated purpose between the housing and the hub member, entails various problems. For example, the motor has a complicated construction, and is expensive. Another problem is that a labyrinth seal structure cannot be provided if the housing is of a certain kind of structure. In such a case, the occurrence of contamination may not be adequately prevented.

Another type of spindle motor has a magnetic fluid seal structure instead of a labyrinth seal structure. Such a magnetic fluid seal means has magnetic fluid retainer means comprising a permanent magnet and a pair of pole pieces disposed on either side of the permanent magnet. The magnetic fluid retainer means is disposed on an annular bush member formed of aluminum, which bush member is mounted on an inner peripheral surface of a hub member. An electrically conductive adhesive is coated over the bush member and the magnetic fluid retainer means, and the bush member and the magnetic fluid retainer means are electrically grounded through the adhesive (the static electricity generated by the rotation of a recording member is grounded through the hub men-her and the adhesive to a frame of the associated driving apparatus).

The provision of such an electrically conductive adhesive, however, necessitates the following: it is necessary to use two types of adhesives, that is, an adhesive for securing the magnetic fluid retainer means, and an electrically conductive adhesive for grounding. It is also necessary to perform an adhering process in two steps. In these adhering steps, it is necessary that the amount of the adhesive as well as the position at which it is to be coated be controlled by means of a plurality of kinds of jigs or machines handled by a highly skilled worker.

If a motor, such as a spindle motor, includes a radial ball bearing as a bearing means, there is a risk that a non-repeating deflection may occur. When the housing of the motor has been subjected, during manufacture, to a grounding operation while being held by a three-pawl chuck, the radius of the housing may have three cycles of undulations (i.e., three crests and three troughs) per 360°. When the housing has such undulations, the undulations may be transferred to the outer ring of the radial ball bearing press-fitted on the inner periphery of the housing, thereby involving the risk that a rolling-ball race on the outer ring may also have similar undulations in the radial direction thereof.

When the rolling-ball race on the inner or outer ring has such radial undulations, the undulations may induce a non-repeating deflection when the motor is rotated. Such a deflection occurring in a spindle motor, such as a spindle motor for driving a hard disk, may cause an off-track action, which may in turn cause a reading or writing error.

SUMMARY OF THE INVENTION

A first object of the present invention is to provide a spindle capable of achieving, with a relatively simple structure, secure prevention of the seepage of grease or the like into an accommodation chamber.

A second object of the present invention is to provide a spindle motor capable of facilitating the assembly of a magnetic fluid retainer means while assuring a reliable ground between the hub member and the magnetic fluid retainer means.

A third object of the present invention is to provide a motor capable of minimizing a non-repeating deflection.

The above and other objects and the features of the present invention will be apparent from the following descriptions.

BRIEF DESCRIPTION OF THE DRAWINGS

FIGS. 6(1) and 6(2) are charts showing the relationship between the width of undulations and the position of rolling balls established in the spindle motor shown in FIG. 5;

FIGS. 10(1) and 10(2) are charts showing the relationship between the width of undulations and the position of rolling balls established in an comparison example.

DESCRIPTION OF THE PREFERRED EMBODIMENTS

A specific example of a spindle motor which is in turn an example of a motor according to the present invention, will now be described with reference to the accompanying drawings.

The spindle motor illustrated here has a housing 11, and a hub member 10 rotatable relative to the housing 11. The hub member 10 has a cylindrical hub body 10a, an end wall portion 10c provided at an end of the hub body 10a (at an upper end, as viewed in FIG. 1), and an annular flange portion 10d provided at the other end of the hub body 10a. A recording member (not shown), such as a magnetic disk, is to be set on the annular flange portion 10d so that the disk can be driven integrally with the hub member 10 and rotated in a predetermined direction. The hub member 10 includes an annular supporting wall portion 10b integral therewith, the supporting wall portion 10b extending downward (as viewed in FIG. 1) from an inner peripheral position of the end wall portion 10c.

Figure 1:
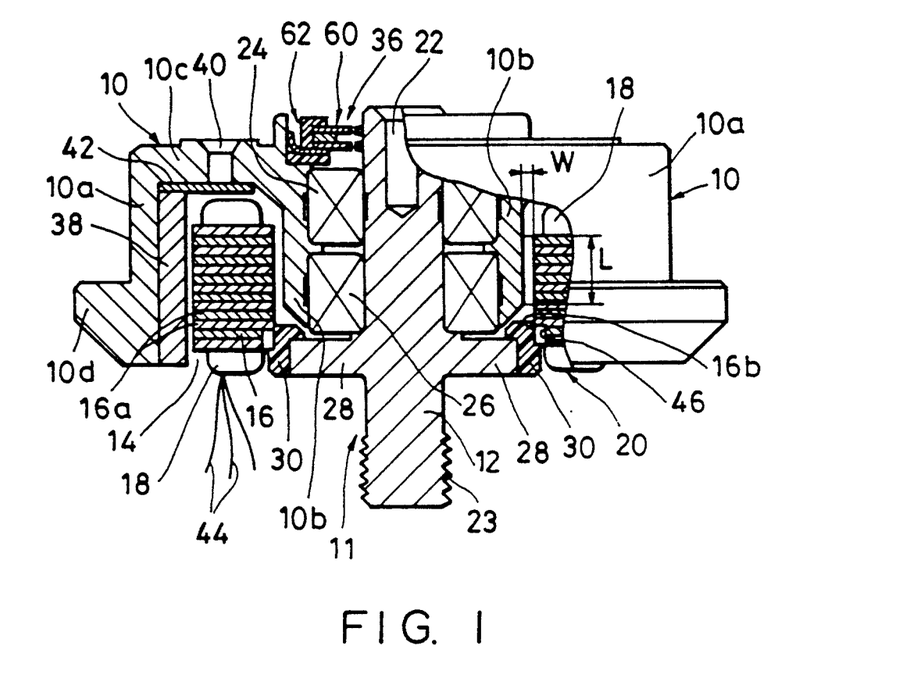
FIG. 1 is a partially cut-away sectional view of a spindle motor, an example of a motor according to the present invention.

The housing 11 has an axial portion 12, and a stator-fixing portion 28 provided at a lower portion of the axial portion 12 integrally therewith. Alternatively, the stator-fixing portion 28 and the axial portion 12 may be constructed as separate members, the axial portion 12 being fastened to the stator-fixing portion 28 by a press-fitting or a like method.

A pair of ball bearings 24 and 26, serving as bearing means, are disposed between an upper portion of the axial portion 12 of the housing 11 and the supporting wall portion 10b of the hub member 10. The axial portion 12 has an external thread portion 23 formed on a lower end portion thereof, the external thread portion 23 being able to be threaded into a portion of a lower frame (not shown) of the associated driving apparatus. The axial portion 12 also has an internal thread hole 22 formed in an upper end portion thereof. When a fastening screw (not shown) is threaded into the internal thread hole 22, the upper end portion of the axial portion 12 is fastened to an upper frame (not shown) of the driving apparatus.

An annular rotor magnet 38 is disposed on the inner peripheral surface of the hub body 10a of the hub member 10. A stator 20 is disposed at a position inward of the rotor magnet 38 while facing the rotor magnet 38. The stator 20 includes a stator core 16 consisting of a plurality of core plates 16a stacked up on each other. The stator core 16 is disposed in an annular space 14 defined between the hub body 10a and the supporting wall portion 10b, both of the hub body 10, and is fixed to the stator-fixing portion 28 of the housing 11 by a core-supporting member 30.

The core-supporting member 30 may be formed of an insulating synthetic resin material, and may be formed by molding it integrally with the stator-fixing portion 28. When the stator core 16 is supported through the intervention of the core-supporting member 30 formed of a synthetic resin, this arrangement enables vibrations generated when the associated armature coil is energized to be attenuated by the core-supporting member 30. The stator core 16 is fixed to the core-supporting member 30 by a press-fitting or a like method. An armature coil 18 is wound, as required, on the stator core 16, and leads 44 from the armature coil 18 are passed through the lower opening of the space 14 and extended to the outside of the motor.

A magnetic fluid seal means 36 is provided at a position above the upper bearing 24 (as viewed in FIG. 1). The magnetic fluid seal means 36 serves to prevent grease or the like from the bearing 24 or 26 from seeping, through various gaps between the axial portion 12 of the housing 11 and the supporting wall portion 10b of the hub member 10, into an accommodation chamber (a chamber accommodating a recording member). The magnetic fluid seal means 36 will be described in detail later.

Figure 2:
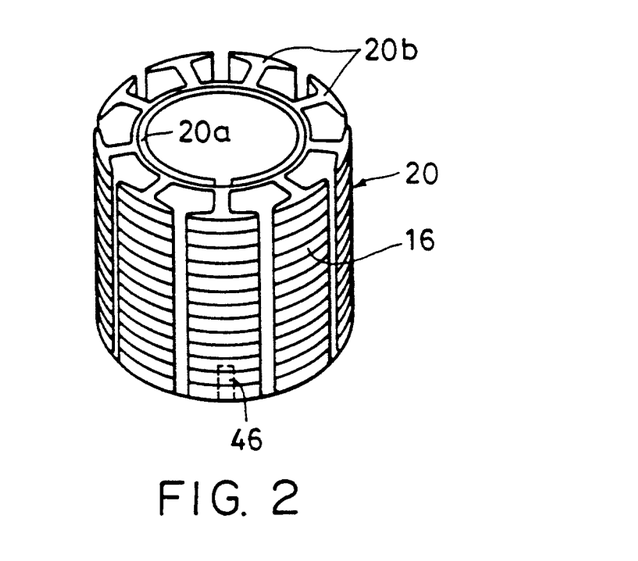
FIG. 2 is a perspective view of a stator core of the spindle motor shown in FIG. 1.

As shown in FIG. 2, the stator 20 has a hollow cylindrical base portion 20a, on the outer peripheral surface of which a plurality of teeth 20b (nine teeth, in the illustrated example) are circumferentially arranged with substantially equal intervals therebetween. The armature coil 18 is wound, as required, on the tooth 20b. In this example, when the stator core 16 is mounted on the core-supporting member 30, the stator core 16 extends from the member 30 to the vicinity of the proximal portion of the supporting wall portion 10b of the hub member 10. The stator core 16 cooperates with the supporting wall portion 10b to constitute an air seal structure. Specifically, the inner peripheral wall of the stator core 16 is positioned outward of the outer peripheral surface of the supporting wall portion 10b, and is located with a slight radial gap defined between the inner peripheral surface and the outer peripheral surface. The gap between the outer peripheral surface of the supporting wall portion 10b and the inner peripheral surface of the stator core 16 should preferably have a radial dimension W of from 0.05 to 0.25 mm, more preferably, from 0.125 to 0.175 mm. These peripheral surfaces which are positioned with the above-described gap therebetween face each other over an axial length L of the peripheral surfaces. The axial length L should preferably be not less than 2 mm, more preferably, not less than 3 mm.

When the positional relationship between the supporting wall portion 10b and the stator core 16 is set as described above, the wall portion 10b and the stator core 16 function as an air seal structure so that it is possible to securely prevent grease or the like from the bearing 24 or 26 from seeping, through the gap between the supporting wall portion 10b and the stator core 16, into the accommodation chamber.

In the illustrated example, a pair of notches 46 are formed on the inner peripheral surface of the stator core 16 at lower end positions thereof, and are spaced apart from each other by an angle substantially equal to 180°. The notches 46 are used as positioning means when the armature coil 18 is wound on the stator core 16. The notches 46 are formed only in a lower end portion of the stator core 16 (in the illustrated example, only in the two lowest of the core plates 16a), and, when the stator core 16 is mounted on the core-supporting member 30, as shown in FIG. 1, the notches 46 are completely filled with parts of the core-supporting member 30. Accordingly, no part of the notches 46 is exposed above the core-supporting member 30. This arrangement enables the dimension of the gap between the inner peripheral surface of the stator core 16 and the outer peripheral surface of the supporting wall portion 10b to remain substantially the same throughout the circumference, thereby preventing the provision of the positioning notches 46 from causing any deterioration in the air sealing performance.

Next, the magnetic fluid seal means 36 will be described with reference to FIGS. 3 and 4 as well as FIG. 1.

The magnetic fluid seal means 36 illustrated here has magnetic fluid retainer means 60 comprising an annular permanent magnet 54, and a pair of pole pieces 56 and 58 disposed on either side of the annular magnet 54. The magnetic fluid retainer means 60 is provided on the hub member 10 through an annular bush member 62 which is mounted on an upper end portion of the inner peripheral surface of the hub member 10, and to which the retainer means 60 is fixed by a press-fitting or a like method. In the illustrated example, the bush member 62 is a member having a body integrally formed of a synthetic resin, the body having a lower wall portion 64 disposed on a shoulder portion formed on the inner peripheral surface of the hub member 10, an annular peripheral wall portion 66 extending substantially perpendicularly from the lower wall portion 64, and an upper wall portion 68 extending radially inward from the upper end of the annular peripheral wall portion 66. The magnetic fluid retainer meas 60 is fixed in place between the lower wall portion 64 and the upper wall portion 68.

The bush member 62 includes a conductive plate attached thereto. The conductive plate comprises conductive plate members 70 which are arranged circumferentially of the bush member 62 with substantially equal intervals therebetween. Each conductive plate member 70 has a base portion 72 radially extending at a position between the lower wall portion 64 and the peripheral wall portion 66, both of the bush member 62. The base portion 72 extends, at a first end thereof, to the lower pole piece 58 of the magnetic fluid retainer means 60. The second end of the base portion 72 is integral with a contact portion 74 which extends upward as it extends radially outward. The conductive plate can be formed of a metal material such as copper or stainless steel. The contact portion 74 acts as a plate spring.

The conductive plate can be formed integrally with the bush member 62. It is preferable that, as in the illustrated example, the magnetic fluid retainer means 60 be also integrally formed by molding. In relation to the above-described arrangement of the conductive plate, the outer peripheral surface of the peripheral wall portion 66 of the bush member 62 is positioned slightly radially inward of the outer peripheral edge of the lower wall portion 64, and the contact portions 74 of the conductive plate members 70 are positioned in the space formed on the outer periphery of the peripheral wall portion 66.

Figure 3:
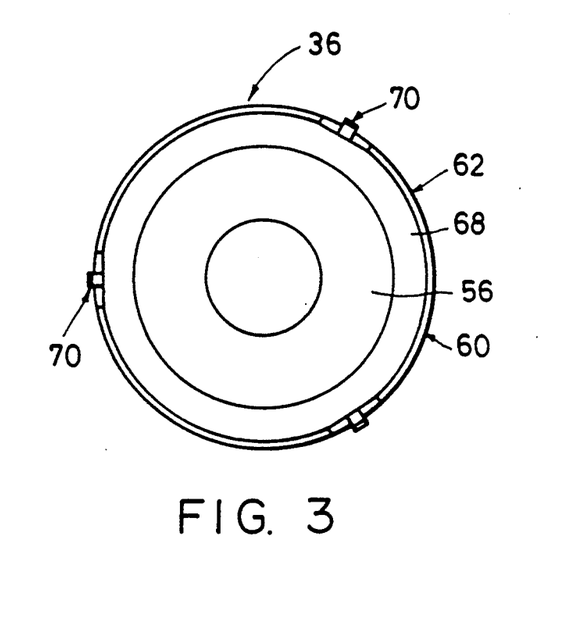
FIG. 3 is a plan view of a magnetic fluid seal means of the spindle motor shown in FIG. 1.
Figure 4:
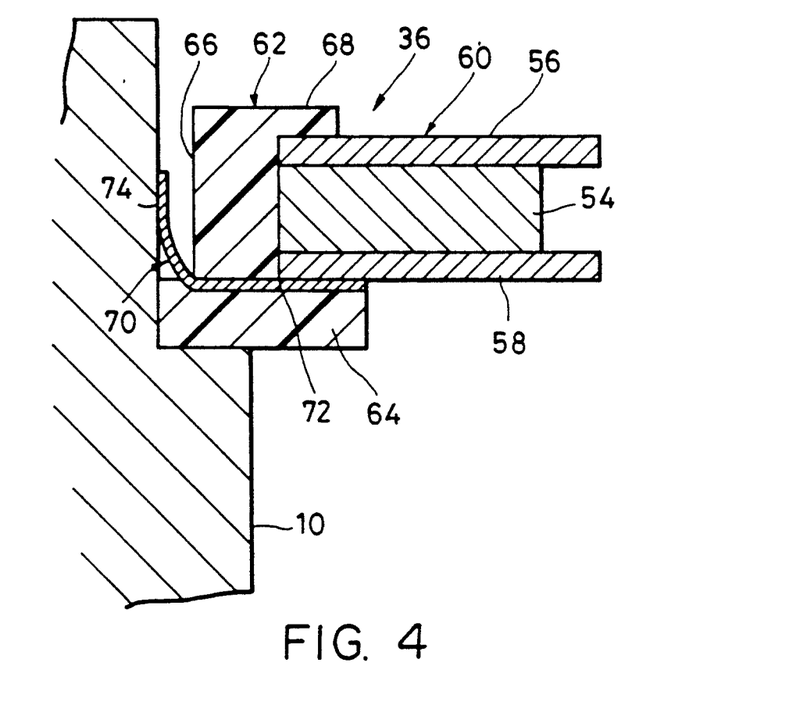
FIG. 4 is a fragmentary enlarged sectional view showing, on an enlarged scale, the essential parts of the magnetic fluid seal means of the spindle motor shown in FIG. 1.

It will be easily understood from FIG. 3 that, when the magnetic fluid retainer means 60 having the above arrangement is assembled on the hub member 10, the contact portions 74 of the conductive plate members 70 are slightly elastically deformed to have their free end portions elastically contacting portions of the inner peripheral surface of the hub member 10. Thus, an electrical ground is provided for the hub member 10 and the magnetic fluid retainer means (the pole piece 58). After the magnetic fluid retainer means 60 has been thus assembled, a magnetic fluid is charged, as required, in the gap between the pair of pole pieces 56 and 58, on one hand, and the axial portion 12 of the housing 11, on the other. As a result, static electricity passing through the hub member 10 is grounded to the axial portion 12 mainly through the conductive plate members 70 and the pole piece 58.

Although in the illustrated example the conductive plate comprises three conductive plate members circumferentially arranged at a certain interval, the conductive plate may comprise only one or two conductive plate members if adequately reliable grounding is possible with such construction.

Although in the illustrated example the magnetic fluid retainer means comprises a permanent magnet and a pair of pole pieces disposed on either side thereof, this construction is not intended to be limitative of the present invention. Further, the above arrangements of the present invention are also applicable to various types of magnetic retainer means (such as means comprising a permanent magnet and a single pole piece) whose construction per se is known.

Next, descriptions will be given of the bearing 24 (or 26) rotatably supporting the hub member 10 serving as the rotor, and elements associated with the bearing.

Figure 5:
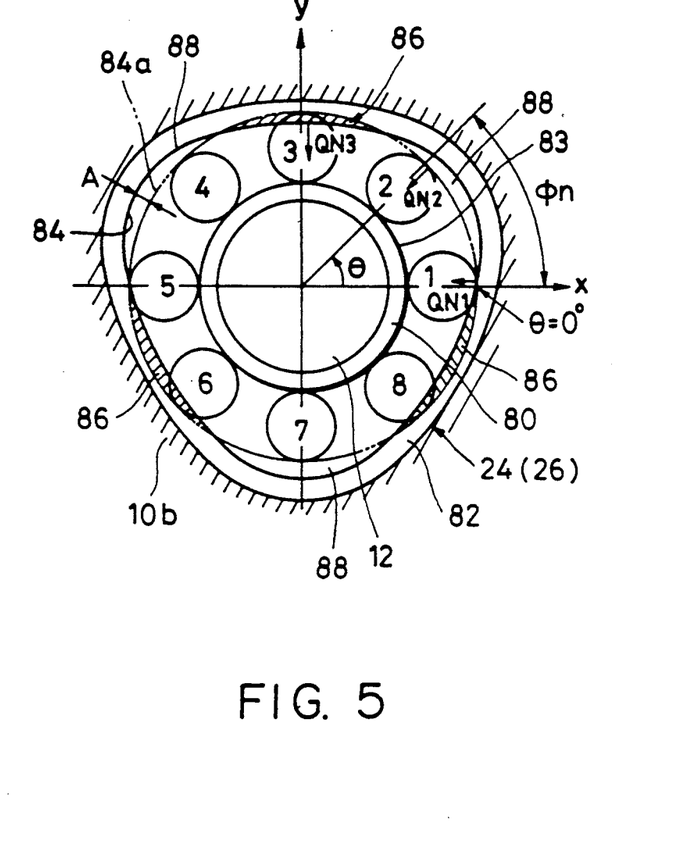
FIG. 5 is a sectional view schematically showing the essential parts of the spindle motor shown in FIG. 1.
Figure 6:
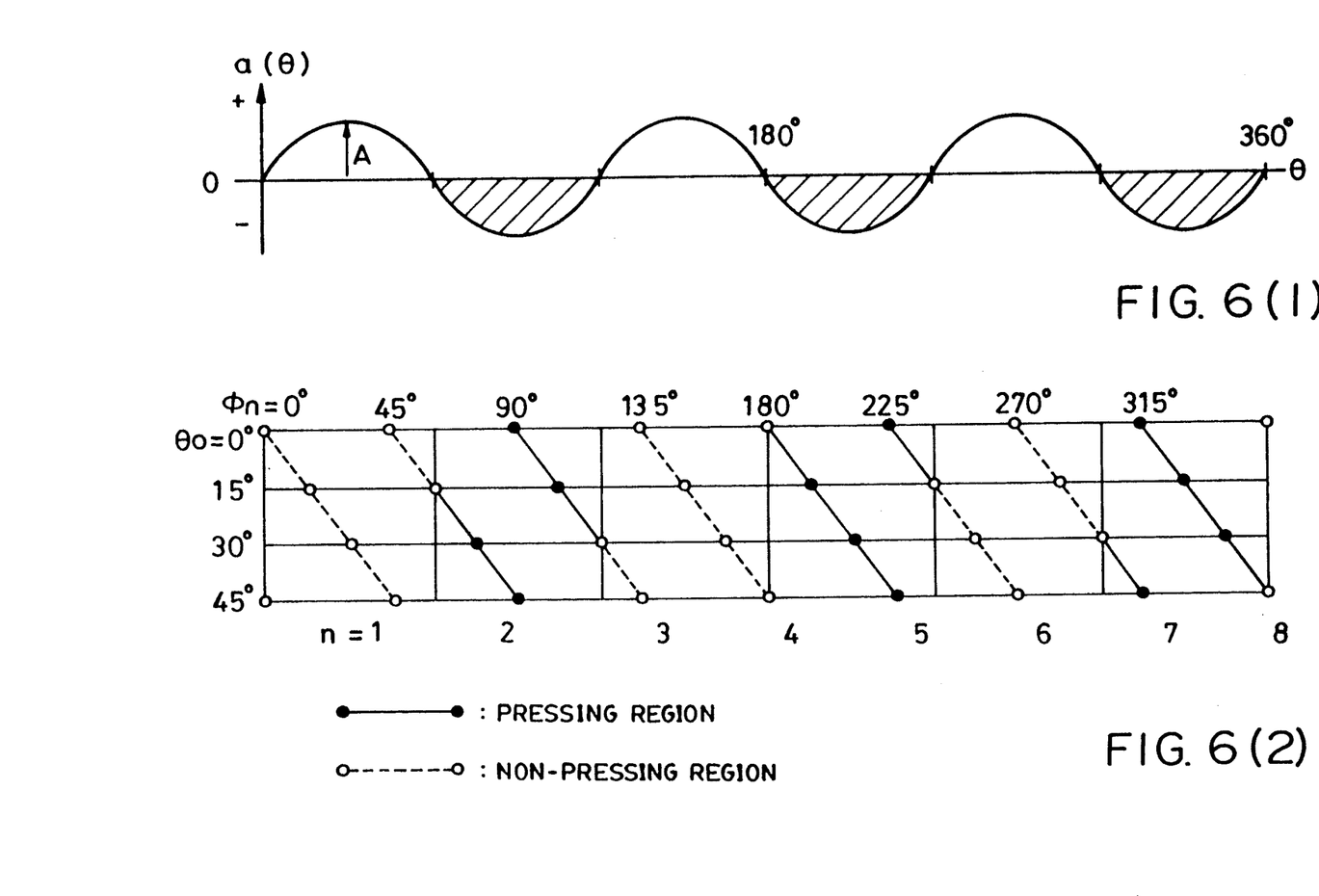

Referring mainly to FIG. 5, the bearing 24 (or 26) disposed between the supporting wall portion 10b of the hub member 10 and the axial portion 12 of the housing 11 is comprised of a radial ball bearing. The bearing 24 (or 26) has an inner ring 80 mounted on a portion of the axial portion 12, an outer ring 82 press-fitted on a portion of the inner peripheral surface of the supporting wall portion 10b, and eight rolling balls 1 to 8 confined between the inner and outer rings 80 and 82. The eight rolling balls 1 to 8 are arranged circumferentially with substantially equal intervals therebetween by virtue of a cage (not shown).

The radius of the supporting wall portion 10b has three cycles of undulations (i.e., three crests and three troughs) per 360°. As a result, the outer ring 82 press-fitted on the inner peripheral surface of the supporting wall portion 10b deforms accordingly, and a rolling-ball race 84 of the outer ring 82 also has three cycles of undulations in the radial direction thereof. In FIG. 5, the two-dot-chain lines indicate a substantially circular track 84a for rolling balls which is provided by the outer ring 82 before its deformation. Denoted by reference numeral 83 is a rolling-ball race of the inner ring 80.

The undulations of the outer-ring rolling-ball race 84 cause the occurrence of pressing regions 86. In these pressing regions 86, when the inner ring 80 and the outer ring 82 are arranged in a coaxial relationship with each other, the rolling balls 1 to 8 are pressed between the inner and the outer rings 80 and 82. A non-pressing region 88 exists between two adjacent pressing regions 86. The radial undulations of the rolling-ball race 84 of the outer ring 82 are such that: they are substantially rotationally symmetrical in such a manner that three part of the undulations can be reflected onto each other during rotation; and a pressing region 86 and a non-pressing region 88 are repeated at a central angle of approximately 60°.

As shown in FIG. 6(1), if the amplitude of the undulations is represented by the symbol A, the width $a(\theta)$ of the undulations which occurs at a position having a central angle $\theta$ measured in the counterclockwise direction from the X axis shown in FIG. 5, is expressed by the following equation:

$$a(\theta) = A \sin 3\theta$$

If a certain angle of rotation of the hub member 10 serving as the rotor, that is, a certain angle of rotation of the outer ring 82, is represented by $\theta_0$, while the angular position of a rolling ball n with respect to a certain reference position is represented by $\phi_n$, the following equation stands:

$$a(\theta) = A \sin 3(\theta_0 - \phi_n)$$

In the illustrated example, $\phi_1 = 0°$ (regarding the rolling ball 1), $\phi_2 = 45°, \ldots \phi_8 = 315°$.

If the load $Q_{Nn}(\theta_0)$ applied to a rolling ball n is calculated on the basis of the Hertz-Fepple theory, the following equation stands:

$$Q_{Nn}(\theta_0) = K^{-1.5} \{-A \sin 3 (\theta_0 - \phi_n)\}^{1.5}$$

where K represents a constant of proportion.

The component in a certain radial direction of the load $Q_{Nn}(\theta_0)$, for example, the component in the positive direction of the X axis shown in FIG. 5, is expressed as:

$$Q_n(\theta_0) = K^{-1.5} \{-A \sin 3 (\theta_0 - \phi_n)\}^{1.5} \cdot \cos (\theta_0 - \phi_n)$$

The above equation expresses the X axis positive-direction component of the load acting on the rolling ball n. Therefore, if the sum of the load components $Q_n(\theta_0)$ regarding the angular positions $\phi_n$ of certain rolling balls in the pressing regions 86 is represented by $Q_{sum}(\theta_0)$, a deflection $\delta$ in the positive direction of the X axis is expressed as: $\delta = K \ Q_{sum}(\theta_0)^{\frac{2}{3}}$. If the maximum value and the minimum value of the sum $Q_{sum}(\theta_0)$ are respectively represented by $Q_{max}$ and $Q_{min}$, the magnitude NRRO of a non-repeating deflection is expressed as follows:

$$NRRO = K(Q_{max}^{2/3} + Q_{min}^{2/3})$$
$$= A\{0.22^{2/3} + (-0.22)^{2/3}\} = 0.73A$$

FIG. 6(2) is a chart showing whether each of the rolling balls n is in one of the pressing region 86 or one of the non-pressing region 88 as the rotational angle $\theta_0$ of the hub member 10 changes.

Those rolling balls (the n numbers thereof) in the pressing regions 86 are as follows:
when $\theta_0$ is from 0° to 15°, n=3, 5, 6 and 8;
when $\theta_0$ is from 15° to 30°, n=2, 3, 5 and 8; and
when $\theta_0$ is from 30° to 45°, n=2, 5, 7 and 8.

Accordingly, when, for example, $\theta_0$ is from 1° to 15°, the following equation stands:

$$Q_{sum}(\theta_0) = Q_3(\theta_0) + Q_5(\theta_0) + Q_6(\theta_0) + Q_8(\theta_0)$$

Figure 7:
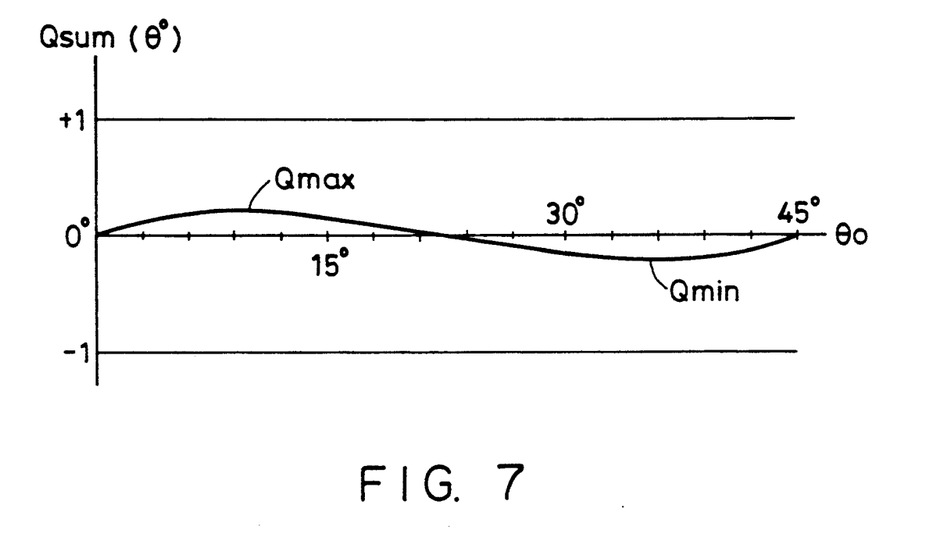
FIG. 7 is a diagram showing the sum of the positive-direction components of the load acting on the rolling balls in the spindle motor shown in FIG. 5.

FIG. 7 shows changes in the sum $Q_{sum}(\theta_0)$.

Figure 8:
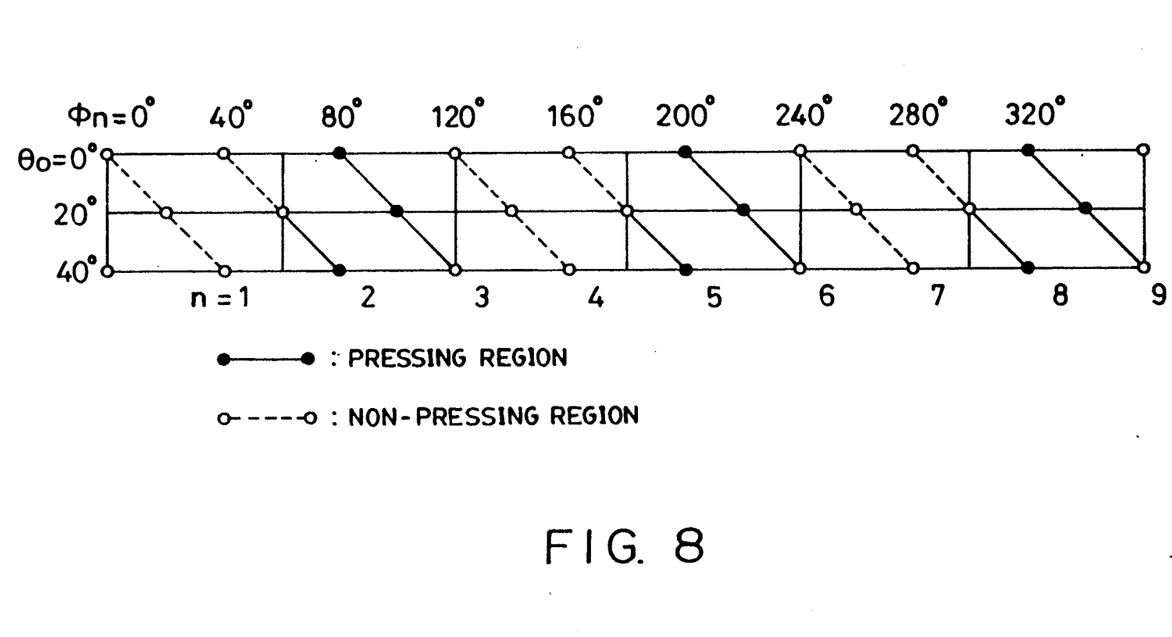
FIG. 8 is a chart showing the relationship between the width of undulations and the position of rolling balls established when another radial ball bearing is used.
Figure 9:
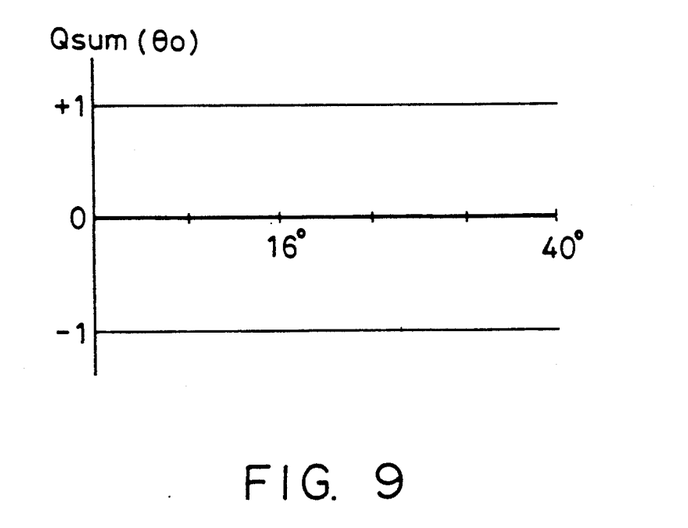
FIG. 9 is a diagram showing the sum of the positive-direction components of the load acting on the rolling balls when the radial ball bearing shown in FIG. 8 is used.
Figure 10:
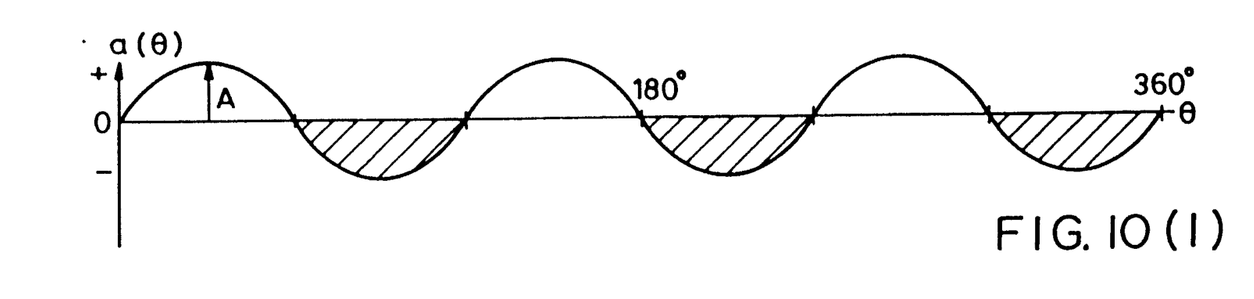

In FIGS. 8 and 9, another example is shown, in which a different radial ball bearing is used.

The example illustrated in FIGS. 8 and 9 has exactly the same arrangement as that shown in FIG. 5 except that the bearing has nine rolling balls 1 to 9.

In this case, the angular positions of the nine rolling balls are: $\phi_1 = 0°$ (regarding the rolling ball 1), $\phi_2 = 40°$, ... $\phi_9 = 320°$.

The magnitude NRRO of a non-repeating deflection is expressed as follows:

$$NRRO = K(Q_{max}^{\frac{2}{3}} + Q_{min}^{\frac{2}{3}}) = 0$$

FIG. 8 shows whether each of the rolling balls n is in one of the pressing regions 86 or one of the non-pressing regions 88 as the rotational angle $\theta_0$ of the hub member 10 changes.

Those rolling balls (the n numbers thereof) in the pressing regions 86 are as follows:
when $\theta_0$ is from 0° to 20°, n=3, 6 and 9; and
when $\theta_0$ is from 20° to 40°, n=2, 3, 5, 6, 8 and 9.

FIG. 7 shows the sum $Q_{sum}(\theta_0)$, or rather, the relationship expressed as: $Q_{sum}(\theta_0) = 0$.

Figure 11:
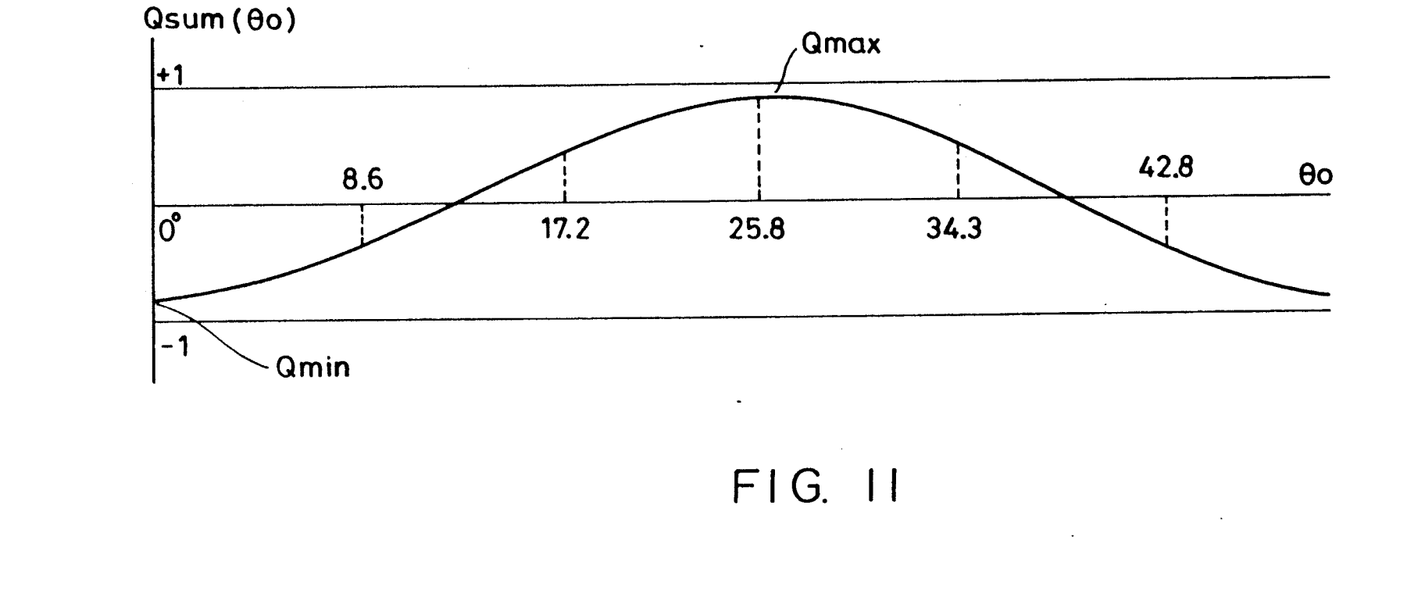
FIG. 11 is a diagram showing the sum of the positive-direction components of the load acting on the rolling balls in the comparison example.

FIGS. 10 and FIG. 11 show a comparison example.

The comparison example has exactly the same arrangement as that shown in FIG. 5 except that, in the comparison example, the number of the rolling balls is seven.

FIG. 10(1) shows the width of undulations a($\theta$). In the comparison example, the angular positions of the seven rolling balls are: $\phi_1 = 0°$ (regarding the rolling ball 1), $\phi_2 = 51.4°, \ldots \phi_7 = 308.6°$.

The magnitude NRRO of a non-repeating deflection is:

$$NRRO = K(Q_{max}^{2/3} + Q_{min}^{2/3})$$
$$= A\{0.87^{2/3} + (-0.84)^{2/3}\} = 1.80A$$

FIG. 10 (2) shows whether each of the rolling balls n is in one of the pressing regions 86 or one of the non-pressing regions 88 as the rotational angle $\theta_0$ of the hub member 10 changes.

Those rolling balls (the n numbers thereof) in the pressing regions 86 are as follows:
when $\theta_0$ is from 0° to 8.6°, n=3, 5 and 7;
when $\theta_0$ is from 8.6° to 17.2°, n=2, 3, 5 and 7;
when $\theta_0$ is from 17.2° to 25.7°, n=2, 5 and 7;
when $\theta_0$ is from 25.7° to 34.3°, n=2, 4, 5 and 7;
when $\theta_0$ is from 34.3° to 42.8°, n=2, 4 and 7; and
when $\theta_0$ is from 42.8° to 51.4°, n=2, 4, 6 and 7.

FIG. 11 shows changes in the sum $Q_{sum}(\theta_0)$ in the comparison example.

A first motor (a specific example of the present invention) in which the number of the rolling balls was eight and the number of the cycles of undulations was three, as well as a second motor (a comparison example) which had the same arrangement as the first motor except that the number of the rolling balls was seven, were manufactured under the same conditions. As a result, it was found that the first motor had a small non-repeating deflection, thereby making it possible to reduce that part of the fraction defective owing to a non-repeating deflection exceeding a certain range.

In the spindle motor being described as the specific example, it is possible to render the magnitude of a non-repeating deflection in the radial direction substantially smaller than the amplitude of the undulations of the rolling-ball race of the inner or outer ring. Therefore, the spindle motor can be advantageously used to drive a hard disk.

Although, in the illustrated specific example of the present invention, those features of the present invention pertaining to a bearing means are applied to a stationary-shaft type spindle motor, the features of the present invention may be applied similarly to a rotary-shaft type spindle motor. In this case, the outer ring of a ball bearing is mounted on a housing while the inner ring of the bearing is mounted on a shaft portion rotatable integrally with a hub member. Further, the features of the present invention pertaining to a bearing means can be similarly applied to various types of motor which are other than spindle motors.

We claim:

1. A spindle motor having a housing, a hub member rotatable relative to said housing, a bearing means disposed between said housing and said hub member, a rotor magnet mounted on said hub member, and a stator mounted on said housing in such a manner as to face said rotor magnet, wherein:

said housing has an axial portion and a stator-fixing portion, said hub member has a hub body on which a recording member is to be set, and a supporting wall portion axially extending from an inner peripheral position of said hub body thereof, said hub member being rotatably supported by said axial portion through said bearing means;

said stator has a stator core disposed in an annular space defined by said hub body and said supporting wall portion, said stator core being fixed to said stator-fixing portion through a supporting member formed by a synthetic resin;

said stator core has a positioning notch formed in a lower end portion thereof, said notch being covered with part of said synthetic resin; the outer peripheral surface of said supporting wall portion and the inner peripheral surface of said stator core extends while facing each other over a sufficient axial length thereof with a slight radial gap defined therebetween; and said supporting wall portion and said stator core cooperate with each other to function as an air seal structure.

2. A spindle motor according to claim 1, wherein said radial gap between said outer peripheral surface of said supporting wall portion of said hub member and the inner peripheral surface of said stator core has a radial dimension of from 0.05 to 0.25 mm.

3. A spindle motor according to claim 2, wherein said radial gap between said outer peripheral surface of said supporting wall portion of said hub member and the inner peripheral surface of said stator core has a radial dimension of from 0.125 to 0.175 mm.

4. A spindle motor according to claim 1, wherein said axial length over which said outer peripheral surface of said supporting wall portion of said hub member and said inner peripheral surface of said stator core face each other is not less than 2.0 mm.

5. A spindle motor according to claim 4, wherein said axial length over which said outer peripheral surface of said supporting wall portion of said hub member and said inner peripheral surface of said stator core face each other is not less than 3.0 mm.

* * * * *

UNITED STATES PATENT AND TRADEMARK OFFICE
CERTIFICATE OF CORRECTION

PATENT NO. : 5,334,895

DATED : August 2, 1994

INVENTOR(S) : Morioka et al.

It is certified that error appears in the above-identified patent and that said Letters Patent is hereby corrected as shown below:

On the title page, item [75] Inventors:

Please delete "Kuniyasu Iwazaki and Kihachiro Ohta".

Signed and Sealed this

First Day of November, 1994

*Attest:*

BRUCE LEHMAN

*Attesting Officer*     *Commissioner of Patents and Trademarks*